(12) United States Patent
Schneider et al.

(10) Patent No.: US 7,031,346 B2
(45) Date of Patent: Apr. 18, 2006

(54) SYSTEM FOR PROVIDING EXTENDED RANGE ADSL SERVICE WITH AUXILIARY POTS CHANNEL OVER SINGLE-LINE DIGITAL SUBSCRIBER LINK

(75) Inventors: Kevin W. Schneider, Huntsville, AL (US); Thomas L. Ballard, III, Madison, AL (US); John B. Wilkes, Jr., Harvest, AL (US); Philip David Williams, Madison, AL (US); Gary M. Willoughby, Harvest, AL (US); Mark Jeffries Ogden, Owens Cross Roads, AL (US); Michael Scott Sansom, Huntsville, AL (US); W. Stuart Venters, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 929 days.

(21) Appl. No.: 09/910,707

(22) Filed: Jul. 20, 2001

(65) Prior Publication Data

US 2003/0016694 A1   Jan. 23, 2003

(51) Int. Cl.
*H04J 1/08* (2006.01)
*H04B 1/38* (2006.01)
(52) U.S. Cl. ..................... 370/493; 375/220
(58) Field of Classification Search ............... 370/352, 370/484–486, 493–495; 375/219–222
See application file for complete search history.

(56) References Cited

U.S. PATENT DOCUMENTS

| | | | |
|---|---|---|---|
| 4,756,007 A | 7/1988 | Qureshi et al. | 375/37 |
| 4,890,316 A | 12/1989 | Walsh et al. | 379/98 |
| 4,924,456 A | 5/1990 | Maxwell et al. | 370/32 |
| 4,991,184 A | 2/1991 | Hashimoto | 375/8 |
| 5,048,054 A | 9/1991 | Eyuboglu et al. | 375/8 |
| 5,751,796 A | 5/1998 | Scott et al. | 379/93.31 |
| 6,091,766 A | 7/2000 | Yoshida | 375/231 |
| 6,167,034 A | 12/2000 | Langberg et al. | 370/281 |
| 6,246,695 B1 * | 6/2001 | Seazholtz et al. | 370/468 |
| 6,539,081 B1 * | 3/2003 | Zakrzewski et al. | 379/93.32 |
| 6,625,262 B1 * | 9/2003 | Starr | 379/93.08 |
| 6,639,911 B1 * | 10/2003 | Bingham | 370/352 |
| 6,731,678 B1 * | 5/2004 | White et al. | 375/219 |
| 6,829,246 B1 * | 12/2004 | Silberman et al. | 370/463 |
| 6,879,591 B1 * | 4/2005 | Kuboniwa | 370/395.1 |
| 6,925,091 B1 * | 8/2005 | Sjoberg et al. | 370/463 |
| 2002/0009133 A1 * | 1/2002 | De Clercq et al. | 375/222 |
| 2002/0027900 A1 * | 3/2002 | Hiartarson et al. | 370/352 |
| 2002/0191777 A1 * | 12/2002 | Milbrandt et al. | 379/387.01 |

* cited by examiner

*Primary Examiner*—Hassan Kizou
*Assistant Examiner*—Gregory Sefcheck
(74) *Attorney, Agent, or Firm*—Allen, Dyer, Doppelt, Milbrath & Gilchrist, P.A.

(57) ABSTRACT

Relatively low cost asymmetric digital subscriber line (ADSL) service and auxiliary POTS service are delivered over extended distances (e.g., at least 20–25 kft), by a hybrid ADSL-SDSL architecture insertable between central office and remote sites of an ADSL system. Central office and remote site transceivers employ trellis coded pulse amplitude modulation and a data rate that conforms with the signal transport capability of an extended distance symmetric DSL (SDSL) loop, while providing a 64K POTS channel. The central office and remote site transceivers controllably insert idle asynchronous transfer mode (ATM) cells in upstream and downstream ADSL channels to compensate for timing differences with ADSL equipment.

33 Claims, 4 Drawing Sheets

SYSTEM FOR PROVIDING EXTENDED RANGE ADSL SERVICE WITH AUXILIARY POTS CHANNEL OVER SINGLE-LINE DIGITAL SUBSCRIBER LINK

CROSS-REFERENCE TO RELATED APPLICATIONS

The present invention relates to subject matter disclosed in co-pending U.S. patent application, Ser. No. 09/910,146 (hereinafter referred to as the '146 application), filed coincident herewith, by T. Ballard et al, entitled: "METHOD OF INDUCING ADSL COMMUNICATION DEVICE TO TRANSMIT AT DOWNSTREAM SIGNALING RATE OPTIMIZED FOR EXTENDED RANGE ADSL SERVICE WITH AUXILIARY POTS CHANNEL OVER SDSL LINK" and co-pending U.S. patent application, Ser. No. 09/910,699 (hereinafter referred to as the '699 application), filed coincident herewith, by J. Zakrezewski et al, entitled: "METHOD OF ESTABLISHING SIGNALING RATE FOR SINGLE-LINE DIGITAL SUBSCRIBER LINK PROVIDING EXTENDED RANGE ADSL SERVICE HAVING AUXILIARY POTS CHANNEL," each application being assigned to the assignee of the present application and the disclosures of which are incorporated herein.

FIELD OF THE INVENTION

The present invention relates in general to telecommunication systems and networks, and is particularly directed to a new and improved data rate-optimized scheme for effectively extending the range of asymmetric digital subscriber line (ADSL) service, while also providing an auxiliary plain old telephone service channel, over a two-wire transmission (symmetric DSL or SDSL) path, to distances well beyond those currently possible without a repeater.

BACKGROUND OF THE INVENTION

The ability to conduct high-speed data communications between remotely separated data processing systems and associated subsystems and components has become a requirement of a variety of industries and applications such as business, educational, medical, financial and personal computer uses, and it can be expected that current and future applications of such communications will continue to engender more systems and services in this technology.

Associated with such applications has been the growing use and popularity of the "Internet", which continues to stimulate research and development of advanced data communications systems between remotely located computers, especially communications capable of achieving relatively high-speed data rates over an existing signal transport infrastructure (e.g., legacy copper cable plant).

One technology that has gained particular interest in the telecommunication community is digital subscriber line (DSL) service, which enables a public service telephone network (PSTN) to deliver (over limited distances) relatively high data bandwidth using conventional telephone company copper wiring infrastructure. DSL service has been categorized into several different technologies, based upon expected data transmission rate, the type and length of data transport medium, and schemes for encoding and decoding data.

Regardless of its application, the general architecture of a DSL system essentially corresponds to that diagrammatically shown in FIG. 1, wherein a pair of remotely separated mutually compatible digital communication transceivers are coupled to a communication link, such as a twisted pair of an existing copper plant. One of these transceivers, denoted as a 'west site' DSL transceiver 11, is typically located in a digital subscriber line access multiplexer (DSLAM) 12 at a network controller site 13 (such as a telephone company central office (CO)). The other transceiver, denoted as an 'east site' DSL modem 21, may be coupled with a computer 22 located at a customer premises 23, such as a home or office.

Within the communication infrastructure of the telephone company, the 'west site' DSLAM 12 is coupled with an associated network 'backbone' 15, which communicates with various information sources 31 and the Internet 33. This telecommunication fabric thus allows information, such as Internet-sourced data (which is readily accessible via the backbone network 15), to be transmitted from the central office DSL transceiver 11 over the communication link 10 to the compatible DSL transceiver 21 at the customer site 23.

In a DSL system of the type described above, the data rates between DSL transceivers are considerably greater than those for voice modems. For example, while voice modems typically operate at voice frequency band, from DC up to a frequency on the order of 4 KHz (with data rates around 28 Kbps), DSL data transceivers may operate in a bandwidth between 25 KHz to well over 1 Mbps, with data rates typically greater than 200 Kbps and up to 50 Mbps (as in the case of a Very-high-data-rate Digital Subscriber Line (VDSL)). This voice/data bandwidth separation allows high-speed data transmissions to be frequency division multiplexed with a separate voice signal over a common signal transport path.

Moreover, the high-speed frequency band used for ADSL data communications may be 'asymmetrically' subdivided or separated (as per (1998) ANSI standard T.413) as shown in FIG. 2, to allocate a larger (and higher frequency) portion of the available spectrum for 'downstream' (west-to-east in FIG. 1) data transmissions from the central office site to the customer site, than data transmissions in the 'upstream' direction (east-to-west in FIG. 1) from the customer site to the central office.

As a non-limiting example, for the case of a single twisted copper pair, a bandwidth on the order of 25 KHz to 125 KHz may be used for upstream data transmissions, while a considerably wider bandwidth on the order of 130 KHz to 1.2 MHz may be used for downstream data transmissions. This asymmetrical downstream vs. upstream allocation of ADSL data bandwidth is based upon the fact that the amount of data transported from the central office to the customer (such as downloading relatively large blocks of data from the Internet) can be expected to be considerably larger than the amount of information (typically e-mail) that users will be uploading to the Internet.

Fortunately, this relatively wide separation of the upstream and downstream frequency bands facilitates filtering and cancellation of noise effects, such as echoes, by relatively simple bandpass filtering techniques. For example, an upstream echo of a downstream data transmission will be at the higher (downstream) frequency, when received at the central office, so as to enable the echo to be easily filtered from the lower (upstream) frequency signal. Frequency division multiplexing also facilitates filtering of near-end crosstalk (NEXT), in much the same manner as echo cancellation.

In addition to ADSL, there are a number of other DSL technologies, such as High-Bit-Rate Digital Subscriber Line (HDSL), Symmetric Digital Subscriber Line (SDSL), and Very-high-data-rate Digital Subscriber Line (VDSL). Also, HDSL2 (ANSI Standard T.418 (2000)) uses one twisted pair for full duplex 1.544 Mbps payload delivery up to a distance on the order of 18 kft.

Among these, HDSL, unlike ADSL described above, has a symmetric data transfer rate—communicating at the same speed in both upstream and downstream directions. Currently perceived data rates for HDSL are on the order of 1.544 Mbps of bandwidth; however HDSL requires more signal transport infrastructure—two copper twisted pairs. In addition, the operating range of HDSL is more limited than that of ADSL, and is currently considered to be effective at distances of up to approximately 12,000 feet or less, beyond which signal repeaters are required.

SDSL (which is described in ITU standards publications) delivers symmetric data transfer speed that is comparable to HDSL2; however, as pointed out above, it employs only a single twisted copper pair; consequently, its range is currently limited to approximately 10,000 feet. Rates of SDSL are dependent upon line characteristics, such as wire gauge, bridge taps, etc. SDSL may employ rates greater than HDSL2 on short twisted pairs.

VDSL provides asymmetric data transfer rates at considerably higher speeds, e.g., on the order of 13 Mbps to 52 Mbps downstream, and 1.5 Mbps to 2.3 Mbps upstream, which severely limits its range (e.g., 1,000 to 4,500 feet).

In addition to performance considerations and limitations on the transport distance for DSL communications over a conventional twisted-pair infrastructure, the cost of the communication hardware is also a significant factor in the choice of what type of system to deploy. Indeed, a lower data rate DSL implementation may provide high-speed data communications, for example, at downstream data rates on the order of or exceeding 1 Mbps, over an existing twisted-pair network and at a cost that is competitive with conventional non-DSL components, such as V.90, V.34, and ISDN modems (28.8 Kbps to 128 Kbps). ISDN is occasionally referred to as IDSL and is considered by some as a DSL technology.

Still, many telecom service providers currently desire to deliver relatively low cost (repeaterless) ADSL service over extended distances (e.g., on the order of 25 kft). Hence, there is a need for an ADSL line extender.

SUMMARY OF THE INVENTION

In accordance with the present invention, this objective is successfully achieved by a hybrid ADSL-SDSL architecture, that is insertable in a transparent fashion between central office (C) and remote (R) nodes of an existing ADSL system, and which employs a data rate that is optimized to conform with the signal transport capability of the long haul SDSL loop, while also accommodating the inclusion of an auxiliary POTS channel.

For this purpose, the ADSL range-extending architecture of the invention has a pair of 'upstream' and 'downstream' communication sites that communicate with one another over a single, extended range, two-wire SDSL loop. As pointed out above, the length of the SDSL loop may be on the order of up to 25 kft. The upstream site may correspond to a telephone network control site, such as a central office, that contains a central office switch through which POTS service is customarily provided.

The central office site may also contain auxiliary digital communication equipment such as a DSLAM, which receives backbone communications via a channel service unit, coupled by way of a fiber optic line or a DS3 channel delivered over a copper link, with one or more additional information sources and the Internet. The auxiliary equipment (e.g., DSLAM) is typically relatively physically close to the central office and may be within the same installation as the central office switch. This relatively short distance enables high-speed data communications using ADSL protocol by way of a two-wire short haul pair or link coupled between the DSLAM and an ADSL Extender-C (Central Office) or ALE-C of the present invention.

A splitter/combiner is coupled over a POTS link to the central office switch and over an ADSL channel link to the DSLAM. In the downstream direction, the splitter/combiner combines the relatively lower frequency POTS signal with the higher frequency ADSL signal for FDM transport over the short haul link to the ALE-C. The ALE-C contains respective POTS and ADSL processing subsystems, and an associated TC PAM transceiver that serves as the communication interface with the SDSL loop.

These subsystems process and interface the composite POTS and ADSL signals from the splitter to produce a modulated signal data stream for downstream transmission over the SDSL loop to the customer site. They also interface an upstream multiplexed data stream received over the SDSL loop from the customer site into a composite POTS and ADSL signal for delivery to the splitter. The splitter/combiner contains filter circuitry, such as a low-pass filter, as a non-limiting example, that separates an upstream-directed, low frequency POTS signal from the higher frequency ADSL signal within the FDM signal supplied from the ALE-C, for delivery to the switch and the DSLAM.

The downstream (or customer-associated) site may correspond to a customer premises, such as a home or office, and contains a computer and an associated ADSL modem, plus a POTS telephone. Complementary to the network site, the customer site also contains a splitter/combiner, which is coupled over a POTS signal link to the POTS phone, and over an ADSL signal link to the ADSL modem. In the downstream direction, the customer site splitter/combiner splits the downstream POTS signal from the ADSL signal within the FDM (POTS and ADSL) signal, supplied over a single pair from an ADSL Loop Extender-R or ALE-R, for delivery to the POTS phone and the customer modem, respectively.

In the upstream direction, the customer site's splitter/combiner combines the relatively low frequency POTS signal from the customer's phone with a higher frequency ADSL signal from the ADSL modem, for FDM transport over a customer site short haul loop to the ALE-R. The ALE-R then interfaces the composite POTS and ADSL signal from the splitter as an upstream multiplexed data stream over the SDSL loop to the network site.

On the ADSL/POTS interface side, a respective ALE has an FDM port, that terminates a respective short haul loop with a POTS channel subsystem and an ADSL channel subsystem. The POTS channel subsystem has a low pass filter coupled with a (µ-law) codec. In the 'to-the-SDSL loop' direction, the codec outputs a µ-law encoded POTS digital channel to a multiplexer-demultiplexer (mux/demux). In the 'from-the-SDSL loop' direction, the codec outputs a µ-law based decoded POTS signal from the encoded POTS signal it received from the mux/demux. The ADSL channel subsystem has an asymmetric transceiver unit (ATU) coupled between the FDM port and an ATM transceiver. The ATM transceiver performs signal processing functions associated with reception, timing adjustment, and transmission of ATM cell-based ADSL data traffic, including framing, deframing, scrambling, descrambling, idle cell-insertion, etc.

For ADSL communications in the 'to-the-SDSL link' direction, the ATM transceiver supplies the mux/demux with a modified ATM data stream containing (rate adjusting) idle cells that have been controllably inserted into the ATM cell data. In the 'from the SDSL link' direction, the ATM transceiver processes a similar rate-adjusted ATM data stream output by the mux/demux. The mux/demux is interfaced with the SDSL link via a symmetric transceiver unit, that performs TC-PAM based modulation of the composite digitized POTS and data rate-adjusted ATM data stream for application to SDSL loop. It also TC-PAM demodulates a composite digitized POTS and data rate-adjusted ATM data stream received from the SDSL loop.

Each of respective upstream and downstream signal flow paths of the ATM transceivers in the ALE-C and ALE-R includes a cascaded arrangement of a CELLDELIN_ATM operator, an ATMFIFO_2CELL FIFO and a GENCELLS_ATM operator. In the downstream path, DSLAM-originated ATM traffic from the DSLAM is coupled to an CELLDELIN_ATM operator, which deframes the serial ATM cells, descrambles the deframed ATM cells and then writes them into the ATMFIFO_2CELL FIFO. The ALE-C's GENCELLS_ATM operator serially reads out the contents of the ATMFIFO_2CELL FIFO at a prescribed downstream data rate (N×32 K bits per second, where N is based upon the data rate at which the downstream ADSL path from the DSLAM to the ALE-C is running). In accordance with a non-limiting but preferred embodiment, this downstream ADSL data rate may be established using a DSLAM-'spoofing' mechanism of the type described in the above-referenced '146 application.

As the ATMFIFO_2CELL block is read out, the ALE-C's GENCELLS_ATM operator controllably inserts idle ATM cells at a preselected rate (e.g., 8 Kbits per second) to make up for any timing difference between the ALE-C and the DSLAM. This idle cell-modified ATM cell data rate (e.g., N×32K+8 K bps) enables the downstream timing (clocking) of the ALE-C to be asynchronous to the DSLAM. The ALE-C's GENCELLS_ATM operator scrambles the resulting serial cell stream (containing both FIFO-extracted (N×32K) ATM cells and inserted (8K) idle ATM cells), and couples the resulting scrambled bit stream to the mux/demux where the retimed and controllably modified ATM cell stream is combined with the encoded POTS data stream from the μ-law codec for TC-PAM based transmission over the SDSL loop to the downstream customer premises site.

In the downstream path from the SDSL loop, the ALE-R's CELLDELIN_ATM operator receives from the ALE-R's mux/demux the demultiplexed serial DSLAM-originated ATM traffic, as TC-PAM demodulated by its TC-PAM transceiver, which terminates the SDSL loop. The incoming downstream (N×32K+8K) ATM stream is coupled to the ALE-R's CELLDELIN_ATM operator, which deframes the serial ATM cells coming from the DSLAM, descrambles the deframed ATM cells and then writes them into an associated downstream ATMFIFO_2CELL FIFO.

As the ALE-R's downstream GENCELLS_ATM operator controllably reads out the contents of the ATMFIFO_2CELL FIFO at the effective received ATM cell data rate (e.g., N×32K+8 K bits per second), it controllably inserts additional idle ATM cells at a rate that is compatible with the requirement that downstream ADSL circuitry be able to train on multi-bit block (e.g., 32 K bit) boundaries of ATM cell data. For the N×32K+8 K bits per second data rate of the received downstream ATM cell traffic in the present embodiment, this is accomplished by controllably inserting additional idle cells at 24 K bits per second, to realize a total data rate of (N+1)×32 K bits per second. The ALE-R's GENCELLS_ATM operator then scrambles the (N+1)×32K serial ATM cell stream (containing both the ATM cells extracted from the FIFO and additionally inserted 24K idle ATM cells), and couples the resulting scrambled bit stream to an associated ATU for application to the customer premises short haul loop and delivery to the ADSL modem.

In the upstream path, the ALE-R's CELLDELIN_ATM operator receives customer modem-originated ATM traffic, as extracted by the ATU from the composite FDM signal applied to the input port from the short haul path, deframes the serial ATM cells coming from the customer modem, and descrambles the deframed ATM cells. It then writes them into an upstream ATMFIFO_2CELL FIFO at the rate of the ADSL modem link. If the DSLAM upstream data rate is less than or equal to the SDSL data rate, this modem link rate may be defined as having an effective upstream data rate of (M−1)×32 Kbps, where M is the DSLAM's upstream data rate, so that the ALE-R's upstream CELLDELIN_ATM operator writes into the FIFO at (M−1)×32 Kbps. If the DSLAM upstream data rate (M) is greater than the SDSL data rate (P), this modem link rate may be defined as having an upstream data rate of P×32 Kbps, and the ALE-R's upstream CELLDELIN_ATM operator writes into the FIFO at an effective upstream data rate of P×32 Kbps.

The ALE-R's upstream GENCELLS_ATM operator then serially reads out the contents of the ATMFIFO_2CELL FIFO for application to the ALE-R's mux/demux. As it reads out the ATMFIFO_2CELL FIFO, the ALE-R's upstream GENCELLS_ATM operator inserts idle ATM cells at a preselected rate (e.g., 8 Kbits per second) to provide for any timing difference relative to the DSLAM. The ALE-R's GENCELLS_ATM operator scrambles the resulting serial cell stream and couples the scrambled bit stream to the mux/demux, where the retimed and controllably modified ATM cell stream (now having a data rate of either [(M−1)×32K]+8 K bits per second or [P×32K]+8 K bits per second) is combined with the encoded POTS data stream from the codec for application to the customer site's TC-PAM transceiver for transmission over the SDSL loop to the upstream central office site.

In the upstream path of the ALE-C, its CELLDELIN_ATM operator receives the serial (upstream) DSLAM-originated ATM traffic, as demultiplexed from the TC-PAM demodulated data stream. The CELLDELIN_ATM deframes the serial ATM cells of the ATM stream from the downstream modem, descrambles the deframed ATM cells and writes them into an ATMFIFO_2CELL FIFO. The ALE-C's upstream GENCELLS_ATM operator reads out the ATMFIFO_2CELL FIFO at the effective received ATM cell data rate and controllably inserts additional idle ATM cells at a rate that is compatible with the requirement that ADSL circuitry be able to train on 32 K bit boundaries of the ATM cell data.

For an [(M−1)×32K]+8 K bits per second data rate of the received ATM cell traffic, this is accomplished by inserting additional idle cells at 24 K bits per second, to realize a total data rate of M×32 K bps. For a [P×32K]+8 K bits per second data rate of the received ATM cell traffic, this is accomplished by inserting additional idle cells that produces an effective data rate of [(M−P−1)×32K]+8K+24K, or a total data rate of M×32 K bps. The GENCELLS_ATM operator then scrambles the M×32K serial ATM cell stream, and couples the scrambled bit stream to the ATU for application to the short haul loop and delivery to the DSLAM.

DETAILED DESCRIPTION OF THE INVENTION

Figure 1:
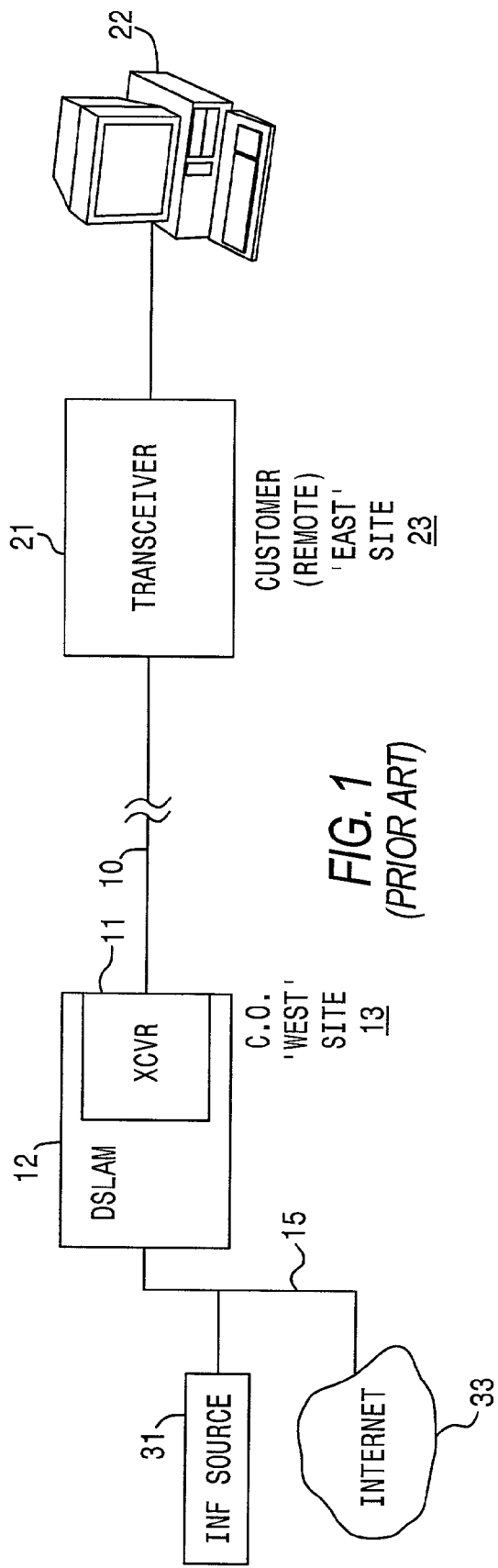
FIG. 1 diagrammatically illustrates the general architecture of a DSL-based telecommunication system.
Figure 2:
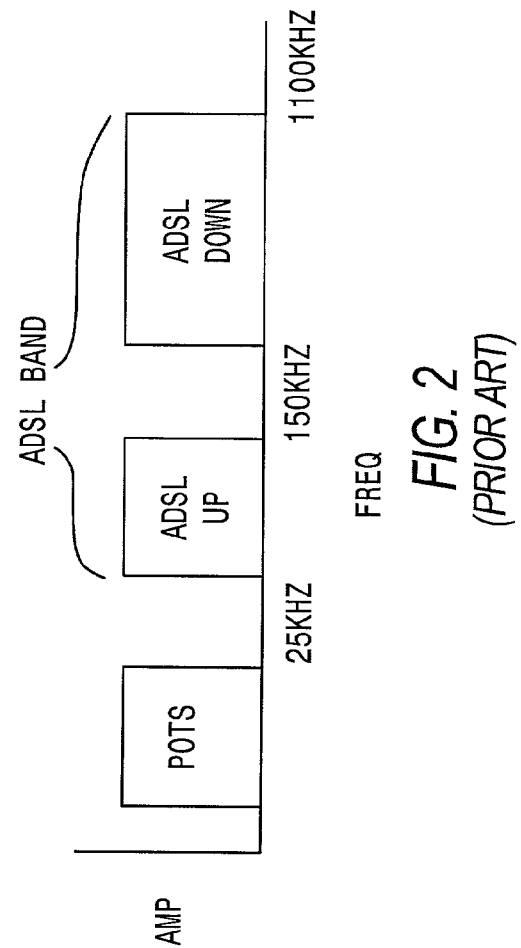
FIG. 2 shows the asymmetric bandwidth allocation employed by an ADSL telecommunication system.

Before detailing the ADSL extended range communication scheme according to the present invention, it should be observed that the present invention resides primarily in a prescribed set of conventional telecommunication signalling hardware components and attendant supervisory communications microprocessor circuitry, that controls the operations of such components. In a practical implementation facilitating their incorporation into existing communication equipment, these arrangements may be readily implemented as field programmable gate array (FPGA) circuits, application specific integrated circuit (ASIC) chip sets, programmable digital signal processors, or general purpose processors.

Consequently, the configuration of such components and the manner in which they are interfaced with other communication equipment of a telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the system in a convenient functional grouping, whereby the present invention may be more readily understood.

For purposes of providing an illustrative embodiment, the following description will detail the ability of the invention to extend the range of ADSL service over a single twisted pair (SDSL link) well beyond (e.g., on the order of 25 kft) its maximum distance of approximately 12,000 feet or less, without the use of repeaters. It should be understood, however, that the communication environment described herein is merely an example of one digital signal transport scheme to which the present invention may be applied and is not to be considered limitative of the invention. Regardless of the communication environment, the invention takes advantage of the availability of application specific integrated circuit manufacturing processes to design and implement integrated circuit-based signal processing components, especially high speed digital ASICs, and enable the practical realization of a reasonably priced transceiver architecture.

Figure 3:
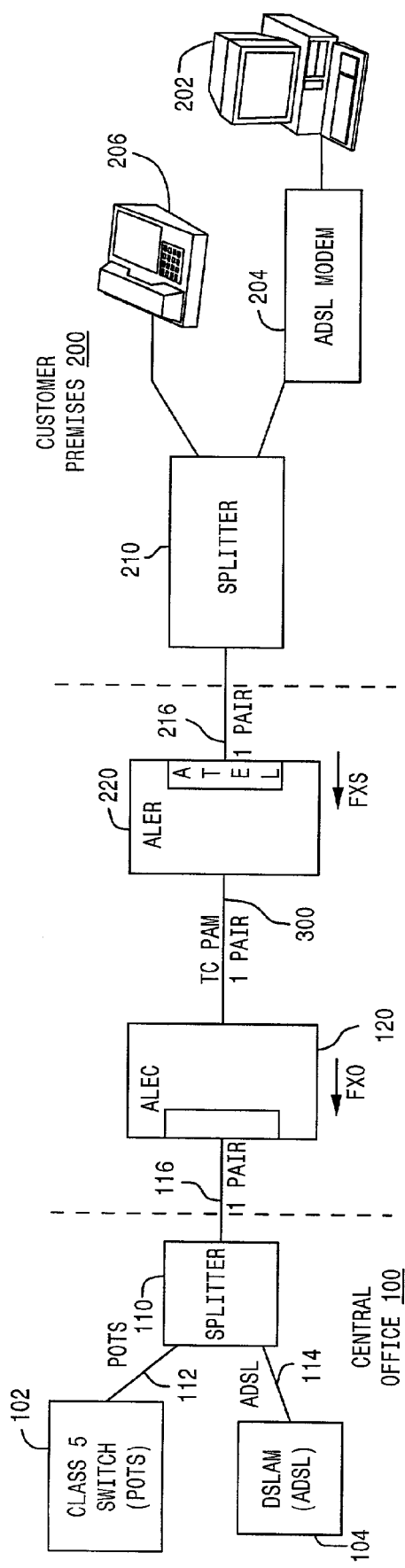
FIG. 3 diagrammatically illustrates an ADSL-based telecommunication system that incorporates the ADSL range-extending communication scheme of the invention.

Referring now to FIG. 3, the overall architecture of a DSL technology-based telecommunication system that incorporates the ADSL range-extending communication scheme of the invention is diagrammatically illustrated as comprising a pair of remotely separated relatively 'upstream' and 'downstream' communication sites 100 and 200, configured to communicate with one another over a single twisted pair (or SDSL path) 300. As pointed out above, and as will be described, by virtue of the communication range-extending functionality of the invention, the length of the intersite link 300 may be on the order of up to 25 kft, which is considerably greater than the customary maximum 10–12 kft distance for conventional ADSL applications.

The upstream (or network-associated) site 100 may correspond to a telephone network controller site, such as a telephone company (telecom) central office, containing a central office switch (such as a conventional AT&T 5ESS switch) 102, through which POTS service is customarily provided. The network site also contains auxiliary digital communication equipment (such as a DSLAM) 104, which provides backbone communications via a channel service unit (CSU), that is coupled by way of a fiber optic line or DS3 transporting copper plant with one or more additional information sources and the Internet.

The Internet service provider (ISP) may be at another location, operated separately from the central office. On the other hand, if the telephone service provider operating the central office equipment also provides Internet access, the ISP may correspond to a separate function within the central office proper or elsewhere in its network. The auxiliary equipment is typically provided relatively close to the central office (often within the same installation as the central office switch). This relatively short distance readily enables high-speed data communications using ADSL protocol by way of a two-wire pair 116 coupled between the DSLAM 104 and an ADSL Extender-C (Central Office) or 'ALE-C' 120 to be described.

Figure 4:
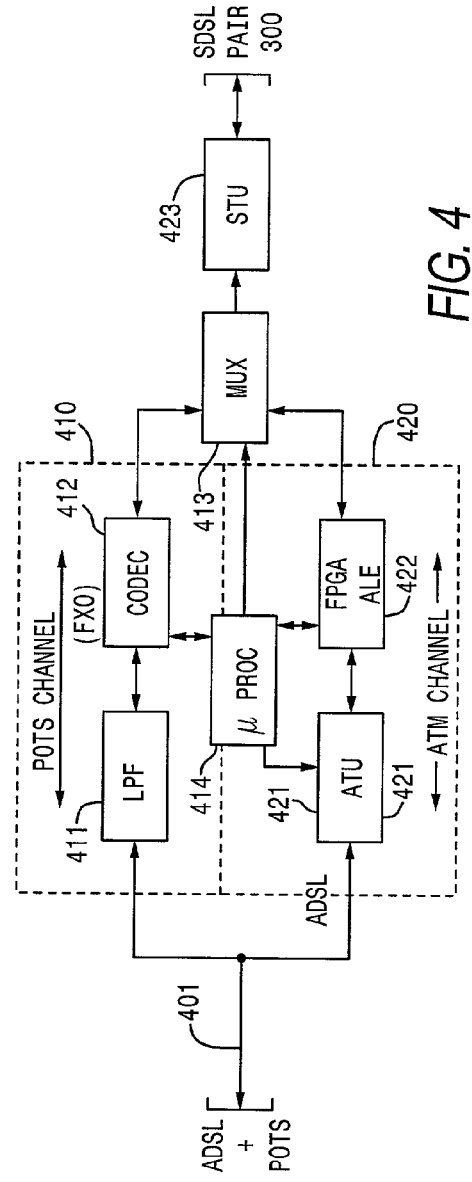
FIG. 4 shows the architecture of a respective ADSL Extender (ALE) installed at each of the network and customer sites of the extended range telecommunication system of FIG. 3.

Network site 100 also includes a splitter/combiner 110, which is coupled over an auxiliary signal (POTS link) 112 to the switch 102 and over an ADSL signal link 114 to the DSLAM 104. In the downstream direction, the splitter/combiner 110 combines the relatively low frequency POTS signal with the higher frequency ADSL signal for FDM transport over link 116 to the ALE-C 120. The ALE-C 120 comprises an ADSL Loop Extender architecture as shown in FIG. 4, to be described, and contains respective POTS and ADSL processing subsystems, and an associated TC PAM transceiver that serves as the communication interface with the SDSL path 300.

As will be described in detail below, these subsystems process and interface the composite POTS and ADSL signals from the splitter/combiner 110 as a downstream multiplexed data stream over the SDSL link 300 to the customer site 200. They also interface an upstream multiplexed data stream received over the SDSL link 300 from the customer site 200 into a composite POTS and ADSL FDM signal for delivery over the link 116 to the splitter/combiner 110. In the upstream direction, the splitter/combiner 110 contains filter circuitry (such as a low pass filter installed a POTS path thereof) that separates an upstream-directed, low frequency POTS signal from the higher frequency ADSL signal within the FDM signal supplied from the ALE-C 120, for delivery to the switch 102 and the DSLAM 104, respectively.

The downstream (or customer-associated) site 200 may correspond to a customer premises, such as a home or office, and contains a computer 202 and an associated ADSL modem 204, plus a POTS telephone 206. Complementary to the network site 100, the customer site 200 contains a splitter/combiner 210, which is coupled over a POTS signal link 212 to the POTS phone 202, and over an ADSL signal link 214 to the ADSL modem 204. In the downstream direction, splitter/combiner 210 contains filter circuitry that splits the downstream POTS signal from the ADSL signal within the FDM (POTS and ADSL) signal, supplied over a two-wire pair 216 from an ADSL Loop Extender-R (Remote) or 'ALE-R' 220, for delivery to POTS phone 206 and customer modem 204, respectively.

In the upstream direction, the splitter/combiner 210 combines the relatively low frequency POTS signal from the POTS phone 206 with the higher frequency ADSL signal from the ADSL modem 204 for FDM transport over the pair 216 to ALE-R 220. Like the ALE-C 120 of the network site 100, ALE-R 220 is comprised of an ADSL Loop Extender architecture as shown in FIG. 4. In the downstream direction, ALE-R 220 interfaces a downstream multiplexed data stream received over the SDSL link 300 from the network site 100 into a composite FDM POTS and ADSL signal for delivery over the link 216 to the splitter/combiner 210. In the upstream direction, the ALE-R 220 interfaces a composite POTS and ADSL signal from the splitter/combiner 210 as an upstream multiplexed data stream for TC-PAM transmission over the SDSL link 300 to the network site 100.

FIG. 4 shows the architecture of a respective ADSL Loop Extender (ALE) that is installed at each of the network (central office (C)) site 100 and the customer (remote (R)) site 200 of the extended range telecommunication system of FIG. 3. On the ADSL/POTS interface side, the ALE has an FDM port 401 coupled to a respective one of the twisted pairs 116 and 216. Port 401 is coupled to each of a POTS channel processing subsystem 410 and an ADSL channel processing subsystem 420. The POTS channel subsystem 410 includes a low pass filter (LPF) 411, having a bandpass characteristic associated with POTS voice frequencies, coupled in circuit with a (μ-law) codec 412.

In the 'to the SDSL link' direction (towards the SDSL link 300), codec 412 is operative to perform μ-law encoding of the filtered POTS signals applied to a multiplexer-demultiplexer (mux/demux) 413, under the control of a supervisory communications controller (microprocessor) 414. In the 'from the SDSL link' direction (from the SDSL link 300), codec 412 is operative to perform μ-law based decoding of a received 64 Kbps POTS channel from the mux/demux 413. The ADSL channel subsystem 420 includes an asymmetric transceiver unit-remote (ATU) 421, that is coupled between the FDM port 401 and an ATM transceiver 422.

As will be described below with reference to FIGS. 5 and 6, the ATM transceiver 422 contains of a cascaded arrangement of signal processing components that are operative to perform a prescribed set of signal processing functions associated with reception, timing adjustment, and transmission of ATM cell-based ADSL data traffic, including framing, deframing, scrambling, descrambling, idle cell-insertion, etc. For ADSL communications in the 'to the SDSL link' direction, the ATM transceiver 422 supplies the mux/demux 413 with a modified ATM data stream containing (timing adjustment) idle cells that have been controllably inserted into the ATM cell data provided by the ATU 421, under the control of communications controller 414. In the 'from the SDSL link' direction, ATM transceiver 422 receives a similar rate-adjusted ATM data stream output by the mux/demux 413 for application to and processing by the ATU 421.

Mux/demux 413 is interfaced with the SDSL link 300 via a symmetric DSL transceiver unit (STU) 423. STU 423 is operative to perform TC-PAM based modulation of the output of a composite digitized POTS and data rate-adjusted ATM data stream provided by mux/demux 413 for application to SDSL link 300. It also performs TC-PAM demodulation of the output of the composite digitized POTS and data rate-adjusted ATM data stream received from the SDSL link 300. For a non-limiting example of documentation describing the architecture and range extension signal processing functionality of a TC-PAM based digital communication transceiver, attention may be directed to the U.S. Pat. No. 5,809,033 to M. Turner et al, entitled: "USE OF MODIFIED LINE ENCODING AND LOW SIGNAL-TO-NOISE RATIO BASED SIGNAL PROCESSING TO EXTEND RANGE OF DIGITAL DATA TRANSMISSION OVER REPEATERLESS TWO-WIRE TELEPHONE LINK," assigned to the assignee of the present application, and the disclosure of which is herein incorporated.

Figure 5:
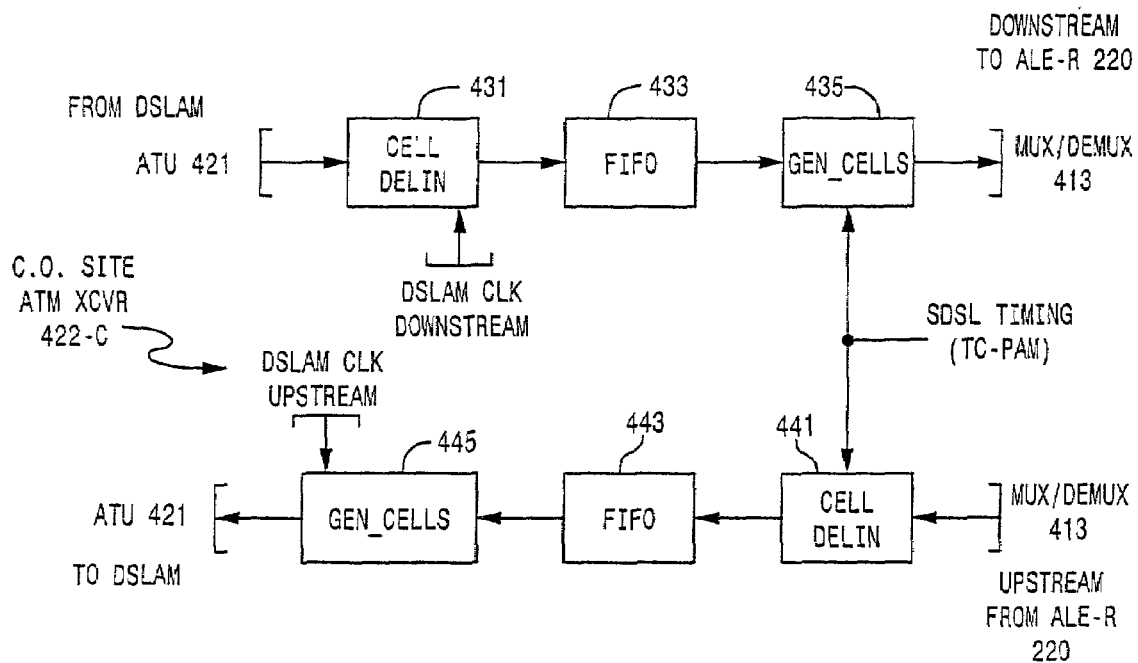
FIG. 5 shows the signal processing functionality of an ATM transceiver of the ALE-C at the network site of the extended range ADSL telecommunication system of FIG. 3.
Figure 6:
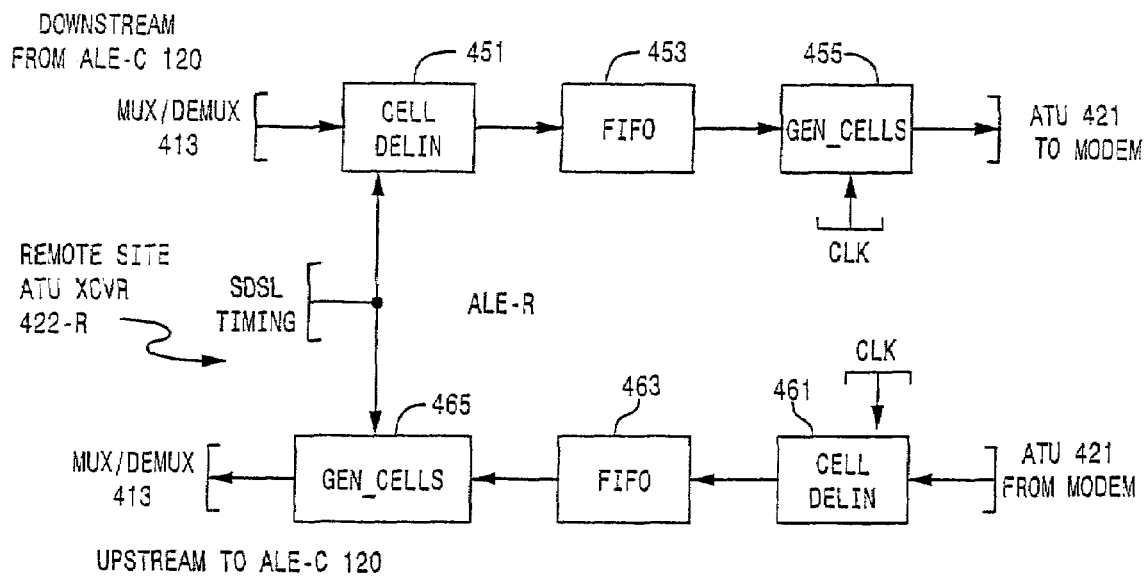
FIG. 6 shows the signal processing functionality of an ATM transceiver of the ALE-R at the customer premises site of the extended range ADSL telecommunication system of FIG. 3.

The signal processing functionality of a network (central office (C)) site ATM transceiver 422-C installed within the ALE-C 120 at the network site 100 is shown in the block diagram of FIG. 5, while that of a similar customer site ATM transceiver 422-R within the ALE-R 220 at the customer site 200 is shown in the block diagram of FIG. 6. The signal processing architectures of ATM transceivers 422-C and 422-R are the same; however, as their respective operational (data rate) parameters are defined by the asymmetrical downlink and uplink communication properties of the link, each ATM transceiver will be described separately.

Considering first the network site ATM transceiver 422-C of FIG. 5, its signal flow path in the 'to the SDSL link' or downstream direction includes a cascaded arrangement of a CELLDELIN_ATM operator or block 431, an ATMFIFIO_2CELL block 433, and a GENCELLS_ATM block 435. In the 'from the SDSL link' or upstream direction, the signal flow path through the ATM transceiver 422-C includes a similar cascaded arrangement of a CELLDELIN_ATM block 441, and ATMFIFO_2CELL block 443, and a GENCELLS_ATM block 445. Each of these blocks, which are preferably implemented in an FPGA, as described above, performs conventional signal processing functions to be described.

In the downstream path, the CELLDELIN_ATM block 431 is coupled to receive DSLAM-originated ATM traffic, as extracted by the ATU 421 from the composite FDM channel applied to the FDM port 401 from the two-wire path 116. The CELLDELIN_ATM block 431 deframes the serial ATM cells coming from the DSLAM 104, descrambles the deframed ATM cells and then writes them into the ATM-FIFO_2CELL block 443. As its name implies, the ATM-FIFO_2CELL block 443 comprises a two (ATM) cell-deep, first-in, first-out shift-register (FIFO). The two (ATM) cell depth of ATMFIFO_2CELL block 443 has been found to provide for transmission timing adjustment or bit-slip compensation, while at the same time reducing hardware complexity.

The GENCELLS_ATM block 435 serially reads out the contents of the ATMFIFO_2CELL block 433 at a prescribed downstream data rate (N×32 K bits per second), where N is based upon the data rate at which the downstream ADSL path from the DSLAM to the ALE-C is running. As mentioned previously, pursuant to a non-limiting but preferred embodiment, this downstream ADSL data rate may be established using a DSLAM-'spoofing' mechanism of the type described in the above-referenced '146 application.

As detailed therein, the data communications controller of the ALE-C executes a prescribed downstream ADSL data rate training procedure that induces the DSLAM to transmit at a (reduced) downstream ADSL data rate, which is compatible with the data rate that is supported by the SDSL link, as well as accommodating an auxiliary (64K) POTS channel. To reduce hardware complexity, the DSLAM spoofing mechanism employs a set of limited size (e.g., eight bit) buffers which store various data rate parameters. One of these buffers stores a RATE_LIMIT code, that is used to signal-to-noise ratio (SNR) a code representative of the signal-to-noise ratio (SNR) on the short haul ADSL link (114, FIG. 3) and reported to the DSLAM 104 by the ALE-C 120.

This RATE_LIMIT code effectively spoofs the DSLAM into perceiving that the signal transport quality of the short haul ADSL link is much lower than its relatively short distance otherwise implies. In response to this perception, the DSLAM sets its downstream data rate less than the data rate that the short haul loop is actually capable of supporting. In particular, the DSLAM is induced into transmitting at reduced downstream data rate that is no higher than the data rate that can be supported by the SDSL link (plus an auxiliary (64K) POTS channel).

In order to ensure that the DSLAM will train at a data rate no higher than the data rate that can be supported by the SDSL link 300 (and also providing an auxiliary (64K) POTS channel), the DSLAM-spoofing mechanism is initially supplied with a "TARGET" SDSL data rate for the SDSL loop. In a preferred embodiment, this TARGET SDSL data rate is derived by means of the SDSL autobaud mechanism of the above-referenced '699 application, which iteratively performs a sequence of signal quality-based measurements over the SDSL loop between the ALE-C 120 and the ALE-R 220.

Pursuant to this autobaud mechanism, the ALE-R 220 initially transmits at a prescribed known power level on the SDSL link 300. Based upon a comparison of the power level received by the ALE-C 120 with the known power level at which the ALE-R transmitted, the ALE-C estimates the length of the SDSL loop 300. From this SDSL loop length estimate, the ALE-C selects an initial, potentially acceptable baud rate and informs the ALE-R of the selected baud rate. The ALE-R then initiates an SDSL training session between the two sites, at the initially selected signaling rate. If the SDSL loop does not successfully train at the initially selected signaling rate, the ALE-C tells the ALE-R to reduce the baud rate, and a further attempt is made to train the SDSL loop. This iterative process continues until the SDSL loop successfully trains.

Once the SDSL loop successfully trains, the SDSL loop signal quality is measured by the ALE-C to determine whether the baud rate will run reliably with the existing noise on the link. If not, the ALE-C tells the ALE-R to reduce the baud rate and/or the number of bits/baud, and the ALE-R restarts the training data sequence, at a reduced number of bits/baud. The iterative training process is then repeated, as necessary until the SDSL loop successfully trains, and the measured signal quality exhibits an acceptable signal-to-noise ratio. The resulting SDSL data rate is employed by the ALE-C to initiate the DSLAM-spoofing routine, and the ALE-C and the ALE-R are placed in data mode.

When operating in data mode, the signal quality is continually monitored. Should the noise level on the SDSL link increase during data mode to a level that results in a less than acceptable signal quality, the ALE-C will transmit a 'reduce baud rate—bits/baud' message to the ALE-R, in response to which the ALE-R restarts the training data sequence, at a further reduced baud rate and/or number of bits/baud. The iterative training and signal quality measurement routine, described above, is then repeated, as necessary, until the loop successfully trains at an acceptable signal-to-noise ratio, at which time the ALE-C and ALE-R are again placed in data mode.

As further described in the '146 application, the SDSL data rate to which the DSLAM is to train may be either a 'fixed' mode data rate, or a 'best efforts' mode data rate. Fixed mode corresponds to the use of a nonadjustable data rate that has been predefined by the telecom service provider, and will typically correspond to a minimum data rate guaranteed to the customer. There is no modification of this data rate; it either conforms with the TARGET SDSL data rate or it does not. Best efforts mode is used to induce the DSLAM to adjust its data rate until it conforms with the SDSL data rate. The minimum guaranteed data rate may range over a prescribed set of values, e.g., between 256K to 896K, at 128K increments. For a 512K×384K service subscription, the guaranteed downstream data rate is 512 Kbps and the upstream data rate is 384 Kbps. In order to provide the 512K downstream data rate (plus the 64K POTS channel), the SDSL link would have to support at least at 512K+64K or 576 Kbps.

When the ALE-C 120 is to operate in fixed data rate mode, the RATE_LIMIT buffer is loaded with an "OVERWRITE DISABLE" code value (e.g., $FF_{HEX}$) that prevents overwriting the data rate that has been pre-established by the telecom service provider. An ADSL training sub-routine is then carried out. For best efforts mode, a 'calibration' training sequence is initially executed by the ALE-C 120. This calibration training sequence allows the DSLAM to train at some initial data rate, that may be subsequently reduced down to conform with the TARGET SDSL data rate.

For this purpose, the RATE_LIMIT buffer is loaded with a prescribed digital code (e.g., $40_{HEX}$) that tells the DSLAM where to set the calibration data rate. The data rate associated with this RATE_LIMIT code may vary depending upon the operational parameters of a particular DSLAM vendor's equipment. It is expected to be relatively fast (e.g., in excess of 1 Mbps), given the relative short length of the ADSL short haul link.

The ADSL link is then trained, and the actual data rate representative digital code ("ACTUAL") at which the ADSL link trained (which can be expected to be in excess of 1 Mbps) is stored in a "CALIBRATE" buffer. Following the calibration train, the difference between the value ($40_{HEX}$) in the RATE_LIMIT buffer and the ACTUAL data rate code is loaded into a "max_down_adjust" buffer. This code difference corresponds to a maximum (MAX) offset between the data rate at which the DSLAM-to-ALE-C link was originally expected to train and the data rate at which this link actually trained. Due to the relatively short distance between the DSLAM and the ALE-C, the MAX difference code is usually a relatively small positive number.

The initial code stored in the RATE_LIMIT buffer is replaced with by the "TARGET" digital code representative of the actual SDSL data rate. The routine then drops the ADSL link and executes a rate limit minimization subroutine, which initially determines whether the polarity of the contents of the max_down_adjust buffer is negative or positive. If negative, it is inferred that the difference between the initial calibration data rate at which the loop is expected to train and the data rate at which it has actually trained is relatively large. In this case, a determination is made as to whether adding the digital value currently stored in the RATE_LIMIT BUFFER (the TARGET SDSL data rate) to that stored in the max_down_adjust buffer will result in an underflow of the max_down_adjust buffer. If so, the subroutine replaces the TARGET data rate code in the RATE-_LIMIT buffer with a minimum (non-zero) value of '1'. However, if the sum of the contents of the RATE_LIMIT BUFFER and the max_down_adjust buffer is non-negative), the TARGET SDSL data rate code in the RATE_LIMIT buffer is increased by the contents of the max_down_adjust buffer (representative of the difference between the value ($40_{HEX}$) and the data rate at which the eventually ADSL link trained).

On the other hand, if the contents of the max_down_adjust buffer are positive, it is inferred that the data rate at which the loop has actually trained is relatively close to its expected value, and the subroutine determines whether adding the contents of the RATE_LIMIT BUFFER to the max_down_adjust buffer will result in an overflow of the max_down_adjust buffer. If not, the (TARGET SDSL data rate) code in the RATE_LIMIT buffer is increased by the contents of the max_down_adjust buffer (representative of the difference between the value ($40_{HEX}$) and the data rate at which the eventually ADSL link trained). Otherwise, the TARGET SDSL data rate associated code in the RATE-_LIMIT buffer is replaced by an all one's value of $FF_{HEX}$ (that disables overwriting the SNR reported to the DSLAM, as pointed out above). The RATE_LIMIT buffer now contains one of a minimum (non-zero) digital code value ('1'), a digital code value ($FF_{HEX}$) that disables overwriting the SNR reported to the DSLAM, or an maximum-adjusted RATE-LIMIT code.

Next, the minimum data rate at which the DSLAM is to operate is set. For this purpose, a determination is made whether a minimum data rate that has been guaranteed to the customer can be accommodated by the (TARGET) SDSL data rate. The "minimum" guaranteed data rate is compared with the difference between the TARGET SDSL rate (as stored in the TARGET register) and the (64 Kbps) data rate of the auxiliary POTS channel. As long as the difference between the TARGET SDSL rate and the (64 Kbps) data rate of the POTS channel is at least equal to or greater than the minimum guaranteed data rate, delivery of that minimum guaranteed data rate to the customer is assured. In this case, the difference between the TARGET SDSL rate and the (64 Kbps) data rate of the auxiliary POTS channel is stored as a "MINIMUM" data rate. On the other hand, if the difference between the TARGET SDSL rate and the (64 Kbps) POTS data rate is less than the minimum guaranteed data rate, the guaranteed minimum value is stored.

An ADSL training sub-routine, which is carried out for both fixed rate and best efforts modes, is then executed. A new ADSL train is conducted. For 'fixed' data rate mode, the RATE_LIMIT buffer will have been loaded with the value $FF_{HEX}$ that inhibits overwriting the data rate that has been pre-established by the telecom service provider. For 'best efforts' (variable) data rate mode, however, the calibration sequence will have resulted in the RATE_LIMIT buffer being loaded with either a value of '1' or a value of $FF_{HEX}$. Once the ADSL link has trained up, the ACTUAL data rate value at which the ADSL link has trained is compared with the contents of the TARGET SDSL data rate. If the trained (ACTUAL) ADSL data rate is greater than the TARGET SDSL data rate, it is concluded that the SDSL link will not support the trained data rate. In this event, routine drops the ADSL link, and returns to 'fixed' or 'best efforts' data rate mode inquiry. For fixed mode, the ADSL training routine is reinitiated. For best efforts mode, the contents of the max-_down_adj register (which had been loaded with a digital code value representative of the difference between the value ($40_{HEX}$) and a digital code value representative of the data rate at which the ADSL link eventually trained) are replaced with a code representative of the difference between the contents of the TARGET register and the ACTUAL data rate register. The routine then transitions back to the rate limit minimization sub-routine, described above.

If the SDSL link will support the (ACTUAL) data rate at which the ADSL loop is currently trained, the ACTUAL data rate is compared with the value of the MINIMUM data rate. If the MINIMUM data rate is greater than ACTUAL data rate, the routine drops the link, and proceeds as described above. If the ACTUAL data rate is greater than or equal to the MINIMUM data rate, the routine inquires whether the mode is 'best efforts' or 'fixed rate'. If 'fixed rate' mode, the DSLAM negotiation is now complete.

For 'best efforts' mode, the contents of the ACTUAL register are compared with those of the CALIBRATE register (which contains data rate at which the loop trained during calibration). If the contents of the ACTUAL data rate register are the same as the contents of the CALIBRATE data rate register, the DSLAM negotiation is complete. However, if the contents of the ACTUAL data rate register are different than the contents of the CALIBRATE data rate register, the contents of the ACTUAL data rate register are compared with the (SDSL data rate) contents of the TARGET data rate register. If the ACTUAL data rate is the same as the TARGET data rate, the DSLAM negotiation is complete).

If the contents of the ACTUAL data rate register differ from the contents of the TARGET data rate register, it is determined whether this is the first time that MAX/MIN conditions have been met. If not, a flag is set indicating that the DSLAM has now met the MAX/MIN conditions, and the routine drops the ADSL loop and proceeds as described above. However, if the MAX/MIN conditions have been satisfied once before, the DSLAM negotiation is complete.

Once DSLAM negotiation has been completed, the DSLAM's downstream data rate code stored in the ACTUAL data rate register (which has been determined to be sufficient to support the SDSL data rate and the auxiliary 64K POTS channel) is forwarded by the ALE-C to the ALE-R in the downstream site for training the customer's modem.

Figure 7:
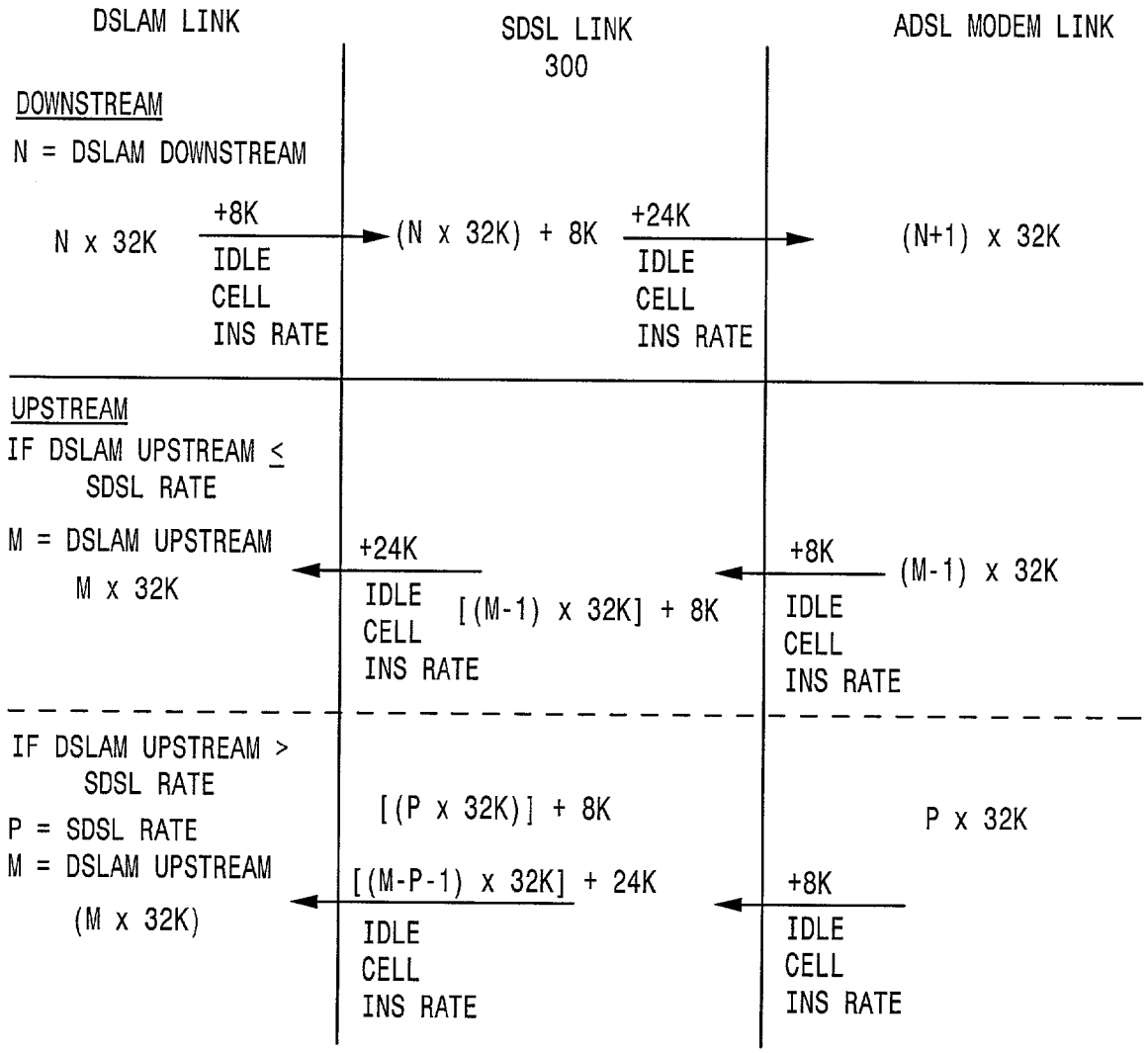
FIG. 7 is a data rate transport diagram showing downstream and upstream idle cell insertion data rates that may be employed in the ALE telecommunication system of FIG. 3.

During downstream data mode, as the GENCELLS_ATM block 435 reads out the ATMFIFO_2CELL block 433, it controllably inserts idle ATM cells at a preselected rate (e.g., 8 Kbits per second, as shown in the downstream portion of the data rate transport diagram of FIG. 7) to make up for any timing difference between the ALE-C 120 and DSLAM 104. This controllably modified ATM cell data rate of N×32K+8 K bits per second on the SDSL link 300 thus enables the timing (clocking) of the ALE-C 120 to be asynchronous to the DSLAM in the downstream direction. In the present example, the choice of an 8 K bits per second as the idle cell insertion rate provides for DSLAM-ALE-C timing adjustment, while maintaining the SDSL baud rate at a value that will not substantially impair the range extension functionality of the TC-PAM encoding performed by the STU 423.

The GENCELLS_ATM block 435 then scrambles the resulting serial cell stream (containing both FIFO-extracted ATM cells and inserted idle ATM cells), and couples the resulting scrambled bit stream to the mux/demux 413, where the retimed and controllably modified ATM cell stream (now having a data rate of (N×32K+8 K) bits per second) is combined with the encoded POTS data stream from the codec 412 for application to the STU 423 and TC-PAM based transmission over the SDSL link 300 to the customer site 200.

Before describing the operation of the upstream signal flow path through the ALE-C's ATM transceiver 422-C, the signal processing functionality of the downstream signal flow path through the customer site ATM transceiver 422-R (FIG. 6), to which the retimed and controllably modified ATM cell stream (having a data rate of (N×32K+8 K) bits per second) within the serial data stream transmitted over the SDSL link 300 from the 'upstream' TC-PAM based transceiver 423 at the network site 100, will be described.

As shown in FIG. 6, similar to the network site's ATM transceiver 422-C, the downstream (here, 'from the SDSL loop') signal flow path through the customer site's ATM transceiver 422-R includes a cascaded arrangement of a CELLDELIN_ATM block 451, an ATMFIFO_2CELL block 453 and a GENCELLS_ATM block 455. In the 'to the SDSL link' or upstream direction, the signal flow path through the customer site ATM transceiver 422-R includes a similar cascaded arrangement of a CELLDELIN_ATM block 461, an ATMFIFO_2CELL block 463 and a GEN-CELLS_ATM block 465.

In the downstream path, the CELLDELIN_ATM block 451 is coupled to receive the serial DSLAM-originated ATM traffic, as transmitted downstream over the SDSL link 300 from the network site's STU 423 and TC-PAM demodulated by a complementary, customer site STU 423 in the ALE-R 220, which terminates the SDSL link 300. The (N×32K+8K) ATM stream as demultiplexed by the ALE-R's mux/demux 413 is coupled to the CELLDELIN_ATM block 451, which deframes the serial ATM cells coming from the upstream DSLAM 104, descrambles the deframed ATM cells and then writes them into ATMFIFO_2CELL block 453.

The GENCELLS_ATM block 455 controllably reads out the contents of the ATMFIFO_2CELL block 453 at the effective received ATM cell data rate (here N×32K+8 K bits per second). In the course of reading out the contents of ATMFIFO_2CELL block 453, the GENCELLS_ATM block 455 controllably inserts additional idle ATM cells at a rate that is compatible with the requirement that downstream ADSL circuitry be able to train on 32 K bit boundaries of ATM cell data.

For the N×32K+8 K bits per second data rate of the received downstream ATM cell traffic in the present embodiment, this is readily accomplished at the GENCELLS_ATM block 455 by controllably inserting additional idle cells at 24 K bits per second, to realize a total data rate of (N+1)×32 K bits per second. It should be noted that since the higher idle cell insertion rate (24K) occurs at the downstream end of the SDSL link 300, it does not affect the SDSL baud rate and therefore will not impair the range extension functionality of TC-PAM encoding performed by upstream STU 423.

The GENCELLS_ATM block 455 of the ALE-R's ATM transceiver 422-R then scrambles the (N+1)×32K serial ATM cell stream (containing both the ATM cells extracted from FIFO 453 and additionally inserted 24K idle ATM cells), and couples the resulting scrambled bit stream to the ATU 421 for application to the link 216 and delivery via downstream splitter 210 to the ADSL modem 204.

For the upstream path from the customer site 200 to the network site 100, the ALE-R's ATM transceiver 422-R includes a CELLDELIN_ATM block 461 coupled to receive customer modem-originated ATM traffic, as extracted by the ATU 421 from the composite FDM signal applied to the FDM port 401 from the two-wire path 216. The CELLDELIN_ATM block 461 deframes the serial ATM cells coming from the customer modem 204, descrambles the deframed ATM cells and then writes them into the ATMFIFO_2CELL block 463.

As described previously, in the upstream path, the ALE-R's CELLDELIN_ATM operator 461 receives customer modem-originated ATM traffic, as extracted by the ATU 421 from the composite FDM signal applied to the FDM port 410 from the short haul path, deframes the serial ATM cells coming from the customer modem, and descrambles the deframed ATM cells. It then writes them into upstream ATMFIFO_2CELL FIFO 463 at the rate of the ADSL modem link.

If the DSLAM upstream data rate is less than or equal to the SDSL data rate, this modem link rate may be defined as having an effective upstream data rate of (M−1)×32 Kbps, where M is the DSLAM's upstream data rate, so that the ALE-R's upstream CELLDELIN_ATM operator 461 writes into the FIFO 463 at (M−1)×32 Kbps. If the DSLAM upstream data rate (M) is greater than the SDSL data rate (P), this modem link rate may be defined as having an upstream data rate of P×32 Kbps, and the CELLDELIN_ATM operator 461 writes into the FIFO 463 at an effective upstream data rate of P×32 Kbps.

When reading out the contents of the ATMFIFO_2CELL block 463, GENCELLS_ATM block 465 controllably inserts idle ATM cells at a preselected rate (e.g., 8 Kbits per second) to provide for any timing difference between the ALE-C 120 and DSLAM 104, as described above. Thus, where the DSLAM upstream data rate M is less than or equal to the SDSL data rate, the resultant effective data rate produced by the GENCELLS_ATM block 465 will be [(M−1)×32K]+8 K bits per second. On the other hand, where the DSLAM upstream data rate M is greater than the SDSL data rate (P), the resultant effective data rate produced by the GENCELLS_ATM block 465 will be [P×32K]+8 K bits per second.

The GENCELLS_ATM block 465 scrambles the resulting serial cell stream (containing both FIFO-extracted ATM cells and inserted idle ATM cells), and couples the resulting scrambled bit stream to the mux/demux 413 of the ALE-R 220, where the retimed and controllably modified ATM cell stream is combined with the encoded POTS data stream from the codec 412 for application to the customer site's STU 423 and TC-PAM based transmission over the SDSL link 300 to the network site 100.

In the upstream path of the ALE-C's ATM transceiver 422-C at the network site 100, CELLDELIN_ATM block 441 is coupled to receive the serial (upstream) modem-originated ATM traffic, as transmitted over the SDSL link 300 from the customer site, and TC-PAM demodulated by the network site's STU 423, which terminates the network end of SDSL link 300. The upstream ATM data stream (having a data rate of [(M−1)×32K]+8K or a data rate of (P−32K)+8K, depending upon the relationship between the DSLAM data rate M and the SDSL rate P, as described above) is demultiplexed by the ALE-C's mux/demux 413 and coupled to the CELLDELIN_ATM block 441. The CELLDELIN_ATM block 441 deframes the serial ATM cells coming from the downstream modem 204, descrambles the deframed ATM cells and writes them into the ATMFIFO_2CELL block 443.

The GENCELLS_ATM block 445 then controllably reads out the contents of the ATMFIFO_2CELL block 443 at the effective received ATM cell data rate and controllably inserts additional idle ATM cells at a rate that is compatible with the requirement that ADSL circuitry be able to train on 32 K bit boundaries of the ATM cell data. For the (M−1)×32K+8 K bits per second data rate, this is readily accomplished by inserting additional idle cells at 24 K bits per second, to realize a total data rate of M×32 K bits per second. For the (P×32K)+8 K bits per second data rate, this is accomplished by inserting additional idle cells so as to realize a total data rate of [(M−P−1)×32K]+24K or M×32 K bits per second.

The M×32 K bps serial ATM cell stream (containing both the ATM cells extracted from the FIFO 463 and additionally inserted idle ATM cells), is scrambled by the GENCELL-S_ATM block 445 and coupled to the ATU 421 for application as an ADSL signal over short haul loop 116 to DSLAM 104.

As will be appreciated from the foregoing description, the desire of telecom service providers to deliver relatively low cost ADSL service over extended distances is readily accomplished by a hybrid ADSL-SDSL architecture that is insertable between central office (C) and remote (R) nodes of an existing ADSL system. By employing TC-PAM modulation and a data rate that conforms with the signal transport capability of the long haul SDSL loop, and also accommodating an auxiliary (64K POTS) channel, the present invention is able to realize an extended ADSL range not heretofore obtained without repeaters. Moreover, using the SDSL-conforming data rate to set the downstream data rate of the DSLAM allows the invention to be interfaced with to a variety of vendor systems and equipments.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

The invention claimed is:

1. A range-extending communication architecture for an asymmetrical digital subscriber line (ADSL) communication system having an upstream site adapted to be coupled to an upstream ADSL communication device that provides access to one or more digital communication resources of a telecommunication network, and a downstream site having a downstream ADSL communication device adapted to interface ADSL communication signals with customer premises equipment, comprising:
   a communication link coupled between said upstream site and said downstream site;
   an upstream site transceiver that is operative to process a downstream ADSL signal provided by said upstream ADSL communication device with a downstream plain old telephone system (POTS) signal into a composite downstream modulated signal for transmission over said communication link to said downstream site; and
   a downstream site transceiver that is operative to receive said composite downstream modulated signal transmitted over said communication link front said upstream site transceiver, and to output said downstream POTS signal for application to a downstream POTS device, and to output said downstream ADSL signal for application to said downstream ADSL communication device, and wherein
   said communication link comprises a long haul loop of the type employed for symmetric digital subscriber loop (SDSL) communications, and wherein said upstream transceiver is adapted to transmit said composite downstream digital signal over said communication link to said downstream site transceiver using trellis coded pulse amplitude modulation (TC-PAM).

2. A range-extending communication architecture for an asymmetrical digital subscriber line (ADSL) communication system having an upstream site adapted to be coupled to an upstream ADSL communication device that provides access to one or more digital communication resources of a telecommunication network, and a downstream site having a downstream ADSL communication device adapted to interface ADSL communication signals with customer premises equipment, comprising:
   a communication link coupled between said upstream site and said downstream site;
   an upstream site transceiver that is operative to process a downstream ADSL signal provided by said upstream ADSL communication device with a downstream plain old telephone system (POTS) signal into a composite downstream modulated signal for transmission over said communication link to said downstream site; and
   a downstream site transceiver that is operative to receive said composite downstream modulated signal transmitted over said communication link from said upstream site transceiver, and to output said downstream POTS signal for application to a downstream POTS device, and to output said downstream ADSL signal for application to said downstream ADSL communication device, and wherein
   said upstream site transceiver includes an ADSL path having an asynchronous transfer mode (ATM) processor, that is adapted to controllably insert idle ATM cells in a serial transport path for ATM cells of a downstream ADSL channel for transmission over said communication link, at a downstream idle ATM cell data rate that compensates for timing differences between said upstream ADSL communication device and a downstream data transmission rate of said upstream site transceiver.

3. The range-extending communication architecture according to claim 2, wherein said ATM processor of said upstream site transceiver comprises a multi-ATM cell-deep, first-in, first-out buffer (FIFO) through which ATM cells of said downstream ADSL channel are controllably serially transferred to provide for said insertion of idle ATM cells.

4. The range-extending communication architecture according to claim 3, wherein said multi-ATM cell-deep FIFO has a depth of two ATM cells.

5. The range-extending communication architecture according to claim 3, wherein said ATM processor of said upstream site transceiver is operative to controllably insert idle ATM cells into said downstream ADSL channel at a rate of 8 Kbps.

6. The range-extending communication architecture according to claim 2, wherein said upstream site transceiver includes a POTS path that is adapted to digitally encode a downstream POTS signal into a downstream digital POTS channel for combination with said downstream ADSL channel and trellis coded pulse amplitude modulation (TC-PAM) based transmission by said TC-PAM modulator over said communication link.

7. A range-extending communication architecture for an asymmetrical digital subscriber line (ADSL) communication system having an upstream site adapted to be coupled to an upstream ADSL communication device that provides access to one or more digital communication resources of a telecommunication network, and a downstream site having a downstream ADSL communication device adapted to interface ADSL communication signals with customer premises equipment, comprising:

a communication link coupled between said upstream site and said downstream site;

an upstream site transceiver that is operative to process a downstream ADSL signal provided by said upstream ADSL communication device with a downstream plain old telephone system (POTS) signal into a composite downstream modulated signal for transmission over said communication link to said downstream site; and a downstream site transceiver that is operative to receive said composite downstream modulated signal transmitted over said communication link from said upstream site transceiver, and to output said downstream POTS signal for application to a downstream POTS device, and to output said downstream ADSL signal for application to said downstream ADSL communication device, and wherein said downstream site transceiver includes an ADSL path having an asynchronous transfer mode (ATM) processor, that is adapted to controllably insert additional idle ATM cells in a serial transport path for received ATM cells, at a downstream idle ATM cell data rate that enables said downstream ADSL communication device to train on multibit block boundaries of ATM call data.

8. The range-extending communication architecture according to claim 7, wherein said ATM processor of said downstream site transceiver includes a multi-ATM cell-deep, first-in, first-out buffer (FIFO) through which ATM cells of said downstream ADSL channel received from said communication link are controllably serially transferred to provide for said insertion of idle ATM Cells.

9. The range-extending communication architecture according to claim 7, wherein said ATM processor of said downstream site transceiver is operative to controllably insert idle ATM cells into said downstream ADSL channel at a rate of 24 Kbps.

10. A range-extending communication architecture for an asymmetrical digital subscriber line (ADSL) communication system having an upstream site adapted to be coupled to an upstream ADSL communication device that provides access to one or more digital communication resources of a telecommunication network, and a downstream site having a downstream ADSL communication device adapted to interface ADSL communication signals with customer premises equipment, comprising:

a communication link coupled between said upstream site and said downstream site;

an upstream, site transceiver that is operative to process a downstream ADSL signal provided by said upstream ADSL communication device with a downstream plain old telephone system (POTS) signal into a composite downstream modulated signal for transmission over said communication link to said downstream site; and a downstream site transceiver that is operative to receive said composite downstream modulated signal transmitted over said communication link from said upstream site transceiver, and to output said downstream POTS signal for application to a downstream POTS device, and to output said downstream ADSL signal for application to said downstream ADSL communication device; and wherein said downstream site transceiver is operative to process an upstream ADSL signal provided by said downstream ADSL communication device with an upstream POTS signal provided by said downstream POTS device into a composite upstream modulated signal for transmission over said communication link to said upstream site transceiver; and said upstream site transceiver is operative to receive said composite upstream modulated signal transmitted over said communication link from said downstream site transceiver, and to output said upstream POTS signal for delivery to an upstream POTS device, and to output said upstream ADSL signal for application to said upstream ADSL communication device; and wherein said downstream site transceiver includes an ADSL path having an asynchronous transfer mode (ATM) processor, that is adapted to controllably insert idle ATM cells in a serial transport path for ATM cells of an upstream ADSL channel for transmission over said communication link, at an upstream idle ATM cell data rate that compensates for timing differences between said upstream ADSL communication device and an upstream data transmission rate of said upstream site transceiver.

11. The range-extending communication architecture according to claim 10, wherein said ATM processor of said downstream site transceiver comprises a multi-ATM cell-deep, first-in, first-out buffer (FIFO) through which ATM cells of said upstream ADSL channel are controllably serially transferred to provide for said insertion of idle ATM cells.

12. The range-extending communication architecture according to claim 11, wherein said multi-ATM cell-deep FIFO has a depth of two ATM cells.

13. The range-extending communication architecture according to claim 11, wherein said ATM processor of said downstream site transceiver is operative to controllably insert idle ATM cells into said upstream ADSL channel at a rate of 8 Kbps.

14. The range-extending communication architecture according to claim 10, wherein said downstream site transceiver includes a POTS path that is adapted to digitally encode an upstream POTS signal into an upstream digital POTS channel for combination with said upstream ADSL channel and transmission by said TC-PAM modulator over said communication link to said upstream site transceiver.

15. A range-extending communication architecture for an asymmetrical digital subscriber line (ADSL) communication system having an upstream site adapted to be coupled to an upstream ADSL communication device that provides access to one or more digital communication resources of a telecommunication network, and a downstream site having a downstream ADSL communication device adapted to interface ADSL communication signals with customer premises equipment, comprising:

a communication link coupled between said upstream site and said downstream site;

an upstream site transceiver that is operative to process a downstream ADSL signal provided by said upstream ADSL communication device with a downstream plain old telephone system (POTS) signal into a composite downstream modulated signal for transmission over said communication link to said downstream site; and a downstream site transceiver that is operative to receive said composite downstream modulated signal transmitted over said communication link from said upstream site transceiver, and to output said downstream POTS signal for application to a downstream POTS device, and to output said downstream ADSL signal for application to said downstream ADSL communication device, and wherein said downstream site transceiver is operative to process an upstream ADSL signal provided by said downstream ADSL communication device with an upstream POTS signal provided by said downstream POTS device into a composite upstream modulated signal for transmission over said communication link to said upstream site transceiver; and said upstream site transceiver is operative to receive said composite upstream modulated signal transmitted over said communication link from said downstream site transceiver, and to output said upstream POTS signal for delivery to an upstream POTS device, and to output said upstream ADSL signal for application to said upstream ADSL communication device, and wherein said upstream site transceiver includes an ADSL path having an asynchronous transfer mode (ATM) processor, that is adapted to controllably insert additional idle ATM cells in a serial transport path for received ATM cells, at an upstream idle ATM cell data rate that enables said upstream ADSL communication device to train on multi-bit block boundaries of ATM cell data.

16. The range-extending communication architecture according to claim 15, wherein said ATM processor of said upstream site transceiver includes a multi-ATM cell-deep, first-in, first-out butter (FIFO) through which ATM cells of said upstream ADSL channel received from said communication link are controllably serially transferred to provide for said insertion of idle ATM cells.

17. The range-extending communication architecture according to claim 15, wherein said ATM processor of said upstream site transceiver is operative to controllably insert idle ATM cells into said upstream ADSL channel at a rate of 24 Kbps.

18. A method of extending the range of an asymmetrical digital subscriber line (ADSL) communication system having an upstream site, that is adapted to be coupled to an upstream ADSL communication device providing access to one or more communication resources of a telecommunication network, and a downstream site having a downstream ADSL communication device that is adapted to interface ADSL communication signals with customer premises equipment, said method comprising the steps of:

(a) at said upstream site, processing a downstream ADSL signal provided by said upstream ADSL communication device with a downstream plain old telephone system (POTS) signal into a composite downstream modulated signal, and transmitting said composite downstream modulated signal over a communication link to said downstream site; and (b) at said downstream site, receiving said composite downstream modulated signal that has been transmitted over said communication link from said upstream site in step (a), extracting therefrom said downstream POTS signal for delivery to a downstream POTS device, and said downstream ADSL signal for delivery to said downstream ADSL communication device, and wherein said communication link comprises a long haul loop of the type employed for symmetric digital subscriber loop (SDSL) communications, and wherein step (a) comprises transmitting said composite downstream modulated signal over said communication link to said downstream site transceiver using trellis coded pulse amplitude modulation (TC-PAM).

19. A method of extending the range of an asymmetrical digital subscriber line (ADSL) communication system having an upstream site, that is adapted to be coupled to an upstream ADSL communication device providing access to one or more communication resources of a telecommunication network, and a downstream site having a downstream ADSL communication device that is adapted to interface ADSL communication signals with customer premises equipment, said method comprising the steps of:

(a) at said upstream site, processing a downstream ADSL signal provided by said upstream ADSL communication device with a downstream plain old telephone system (POTS) signal into a composite downstream modulated signal, and transmitting said composite downstream modulated signal over a communication link to said downstream site; and (b) at said downstream site, receiving said composite downstream modulated signal that has been transmitted over said communication link from said upstream. site in step (a), extracting therefrom said downstream POTS signal for delivery to a downstream POTS device, and said downstream ADSL signal for delivery to said downstream ADSL communication device, and wherein step (a) further includes controllably inserting idle asynchronous transfer mode (ATM) cells in a serial transport path for ATM cells of a downstream ADSL channel for transmission over said communication link, at a downstream idle ATM cell data rate that compensates for timing differences between said upstream ADSL communication device and a downstream data transmission rate employed in step (a).

20. The method according to claim 19, wherein step (a) includes controllably coupling said ATM cells of said downstream ADSL channel through a multi-ATM cell-deep, first-in, first-out buffer (FIFO) to provide for said insertion of idle ATM cells.

21. The method according to claim 20, wherein said multi-ATM cell-deep FIFO has a depth of two ATM cells.

22. The method according to claim 20, wherein step (a) comprises controllably inserting idle ATM cells into said downstream ADSL channel at a rate of 8 Kbps.

23. A method of extending the range of an asymmetrical digital subscriber line (ADSL) communication system having an upstream site, that is adapted to be coupled to an upstream ADSL communication device providing access to one or more communication resources of a telecommunication network, and a downstream site having a downstream ADSL communication device that is adapted to interface ADSL communication signals with customer premises equipment, said method comprising the steps of:

(a) at said upstream site, processing a downstream ADSL signal provided by said upstream ADSL communication device with a downstream plain old telephone system (POTS) signal into a composite downstream modulated signal, and transmitting said composite downstream modulated signal over a communication link to said downstream site; and (b) at said downstream site, receiving said composite downstream modulated signal that has been transmitted over said communication link from said upstream site in step (a), extracting therefrom said downstream POTS signal for delivery to a downstream POTS device, and said downstream ADSL signal for delivery to said downstream ADSL communication device, and wherein step (b) further includes controllably inserting idle asynchronous transfer mode (ATM) cells in a serial transport path for received ATM cells of a downstream ADSL channel, at a downstream idle ATM cell data rate that enables said downstream ADSL communication device to train on multi-bit block boundaries of ATM cell data.

24. The method according to claim 23, wherein step (b) comprises controllably inserting idle ATM cells into said downstream ADSL channel at a rate of 24 Kbps.

25. A method of extending the range of an asymmetrical digital subscriber line (ADSL) communication system having an upstream site, that is adapted to be coupled to an upstream ADSL communication device providing access to one or more communication resources of a telecommunication network, and a downstream site having a downstream ADSL communication device that is adapted to interface ADSL communication signals with customer premises equipment, said method comprising the steps of:

(a) at said upstream site, processing a downstream ADSL signal provided by said upstream ADSL communication device with a downstream plain old telephone system (POTS) signal into a composite downstream modulated signal, and transmitting said composite downstream modulated signal over a communication link to said downstream site; and (b) at said downstream site, receiving said composite downstream modulated signal that has been transmitted over said communication link from said upstream site in step (a), extracting therefrom said downstream POTS signal for delivery to a downstream POTS device, and said downstream ADSL signal for delivery to said downstream ADSL communication device, further including the steps of:

(c) at said downstream site, processing an upstream ADSL signal provided by said downstream ADSL communication device with an upstream POTS signal provided by said downstream POTS device into a composite upstream modulated signal, and transmitting said composite upstream modulated signal over said communication link to said upstream site transceiver; and (d) at said upstream site, receiving said composite upstream modulated signal transmitted over said communication link from said downstream site in step (c), and coupling said upstream POTS signal to an upstream POTS device, and coupling said upstream ADSL signal to said upstream ADSL communication device, and wherein step (c) includes controllably inserting idle ATM cells in a serial transport path for ATM cells of an upstream ADSL channel, at an upstream idle ATM cell data rate that compensates for timing differences between said upstream ADSL communication device and an upstream data transmission rate of step (c).

26. The method according to claim 25, wherein step (d) includes controllably inserting additional idle ATM cells in a serial transport path for received ATM cells, at an upstream idle ATM cell data rate that enables said upstream ADSL communication device to train on multi-bit block boundaries of ATM cell data.

27. An asymmetrical digital subscriber line (ADSL) communication system comprising:

an upstream site transceiver adapted to process a downstream ADSL signal provided by an upstream ADSL communication device and a downstream plain old telephone system (POTS) signal into a composite downstream modulated signal for transmission over a communication link from an upstream site thereof; and a downstream site transceiver, coupled a downstream site of said communication link that is remote with respect to said upstream site, and being operative to receive said composite downstream modulated signal transmitted over said communication link from said upstream site transceiver, and to extract from said composite downstream modulated signal said downstream POTS signal for delivery to a downstream POTS device, and said downstream ADSL signal for delivery to said downstream ADSL communication device, and wherein said upstream site transceiver is coupled over a first, short haul communication loop to said ADSL communication device, said ADSL communication device being capable of conducting ADSL communications over said first, short haul communication loop at a relatively high data rate that conforms with a prescribed communication standard, and exceeds a reduced data rate at which said communication link conforms with said prescribed communication standard, and wherein said ADSL communication device is configured to conduct downstream ADSL communications over said first, short haul loop at a downstream communication data rate that is no greater than said reduced data rate.

28. The ADSL communication system according to claim 27, wherein said reduced data rate is derived in accordance with measurements conducted on said communication link, based on transmissions between said upstream and downstream site transceivers.

29. The ADSL communication system according to claim 27, wherein said downstream communication data rate is less than said reduced data rate by an amount that accommodates the data rate of an auxiliary digital plain old telephone system (POTS) channel.

30. A range-extending communication architecture for an asymmetrical digital subscriber line (ADSL) communication system having an upstream site adapted to be coupled to an upstream ADSL communication device that provides access to one or more digital communication resources of a telecommunication network, and a downstream site having a downstream ADSL communication device adapted to interface ADSL communication signals with customer premises equipment, comprising:

a symmetric digital subscriber line (SDSL) communication link coupled between said upstream site and said downstream site;

an upstream site transceiver that is operative to process a downstream ADSL signal provided by said upstream ADSL communication device for transmission in a downstream modulated signal over said SDSL communication link to said downstream site; and a downstream site transceiver that is operative to receive said downstream modulated signal transmitted over said SDSL communication link from said upstream site transceiver, and to output said downstream ADSL signal for application to said downstream ADSL communication device, and wherein said upstream site transceiver is coupled over a first, short haul communication loop to said upstream ADSL communication device, said upstream ADSL communication device being capable of conducting ADSL communications over said first, short haul communication loop at a data rate that conforms with a prescribed communication standard, and exceeds a reduced data rate at which said SDSL communication link conforms with said prescribed communication standard, and wherein said upstream ADSL communication device is configured to conduct downstream ADSL communications over said first, relatively short haul loop at a downstream communication data rate that is no greater than said reduced data rate.

31. The range-extending communication architecture according to claim 30, wherein said reduced data rate is derived in accordance with measurements conducted on said SDSL communication link, based on transmissions between said upstream and downstream site transceivers.

32. The range-extending communication architecture according to claim 31, wherein said downstream communication data rate is less than said reduced data rate by an amount that accommodates the data rate for an auxiliary plain old telephone system (POTS) signal.

33. A range-extending communication architecture for an asymmetrical digital subscriber line (ADSL) communication system having an upstream site adapted to be coupled to an upstream ADSL communication device that provides access to one or more digital communication resources of a telecommunication network and a downstream site having a downstream ADSL communication device adapted to interface ADSL communication signals with customer premises equipment, comprising:

a symmetric digital subscriber line (SDSL) communication link coupled between said upstream site and said downstream site;

an upstream site transceiver that is operative to process a downstream ADSL signal provided by said upstream ADSL communication device for transmission in a downstream digitally modulated signal having SDSL modulation over said SDSL communication link to said downstream site; and a downstream site transceiver that is operative to receive said downstream digitally modulated signal transmitted over said SDSL communication link from said upstream site transceiver, and to output said downstream ADSL signal for application to said downstream ADSL communication device; and wherein said SDSL communication link comprises a long haul loop of the type employed for SDSL communications, and wherein said upstream transceiver is adapted to transmit said modulated signal over said SDSL communication link to said downstream site transceiver using trellis coded pulse amplitude modulation (TC-PAM).

* * * * *